United States Patent
Dai

(10) Patent No.: US 8,401,306 B2
(45) Date of Patent: Mar. 19, 2013

(54) IMAGE PROCESSING APPARATUS AND CONTROL METHOD

(75) Inventor: Xiaoyan Dai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 221 days.

(21) Appl. No.: 12/751,714

(22) Filed: Mar. 31, 2010

(65) Prior Publication Data

US 2010/0260417 A1  Oct. 14, 2010

(30) Foreign Application Priority Data

Apr. 13, 2009  (JP) .................. 2009-097393

(51) Int. Cl.
- G06K 9/48 (2006.01)
- G06K 9/46 (2006.01)
- G06K 9/34 (2006.01)

(52) U.S. Cl. ............ 382/199; 382/232; 382/176

(58) Field of Classification Search ............ None
See application file for complete search history.

(56) References Cited

U.S. PATENT DOCUMENTS

| | | | | |
|---|---|---|---|---|
| 4,742,551 A * | 5/1988 | Deering | | 382/170 |
| 5,680,478 A * | 10/1997 | Wang et al. | | 382/176 |
| 6,873,436 B1 | 3/2005 | Terada et al. | | |
| 7,783,117 B2 * | 8/2010 | Liu et al. | | 382/232 |
| 2004/0005089 A1 * | 1/2004 | Robles et al. | | 382/141 |
| 2006/0126093 A1 * | 6/2006 | Fedorovskaya et al. | | 358/1.14 |
| 2006/0210157 A1 * | 9/2006 | Agnihotri et al. | | 382/173 |
| 2007/0160295 A1 * | 7/2007 | Wang et al. | | 382/199 |
| 2007/0189615 A1 * | 8/2007 | Liu et al. | | 382/232 |
| 2007/0237241 A1 * | 10/2007 | Ha et al. | | 375/240.27 |
| 2007/0286478 A1 * | 12/2007 | Kishi | | 382/162 |
| 2009/0129635 A1 * | 5/2009 | Abe | | 382/115 |
| 2009/0141940 A1 * | 6/2009 | Zhao et al. | | 382/103 |
| 2009/0148039 A1 * | 6/2009 | Chen et al. | | 382/165 |

FOREIGN PATENT DOCUMENTS

| | | |
|---|---|---|
| JP | 64-081080 | 3/1989 |
| JP | 2002-142128 | 5/2002 |
| JP | 2002-262081 | 9/2002 |
| JP | 2004-350240 | 12/2004 |

* cited by examiner

Primary Examiner — Wenpeng Chen
Assistant Examiner — Feng Niu
(74) Attorney, Agent, or Firm — Fitzpatrick, Cella, Harper & Scinto

(57) ABSTRACT

An image processing apparatus includes a block background/foreground determination unit which determines, based on a block attribute and quantized color information, whether each connected area is a foreground or a background, a block background/foreground attribute determination unit which determines, based on the block attribute, the attribute of a connected area determined to be the foreground of the block and the attribute of a connected area determined to be the background of the block, and a block background/foreground attribute information recording unit which records and holds information of the attribute of the block and the attribute of each connected area.

6 Claims, 13 Drawing Sheets

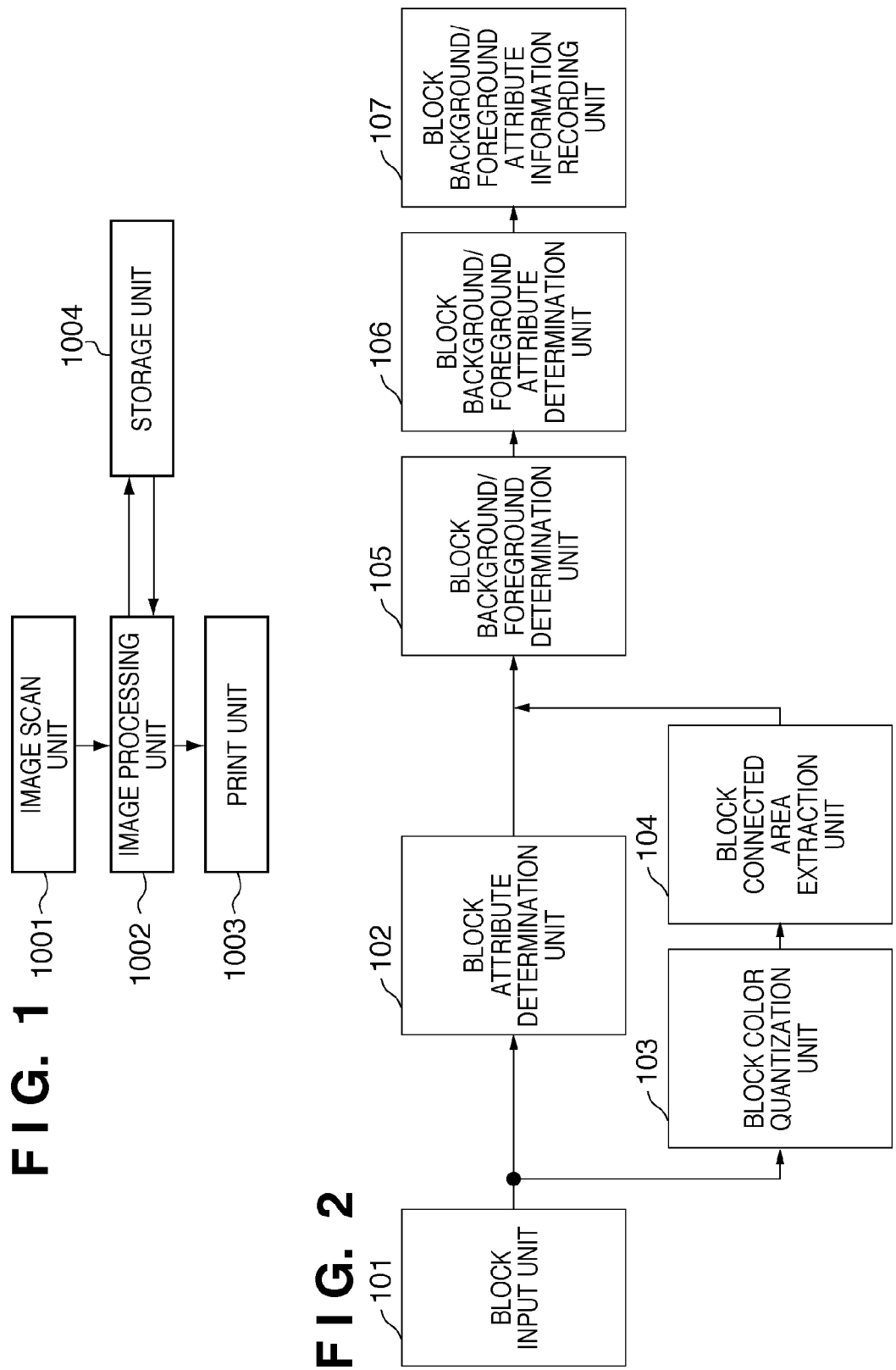

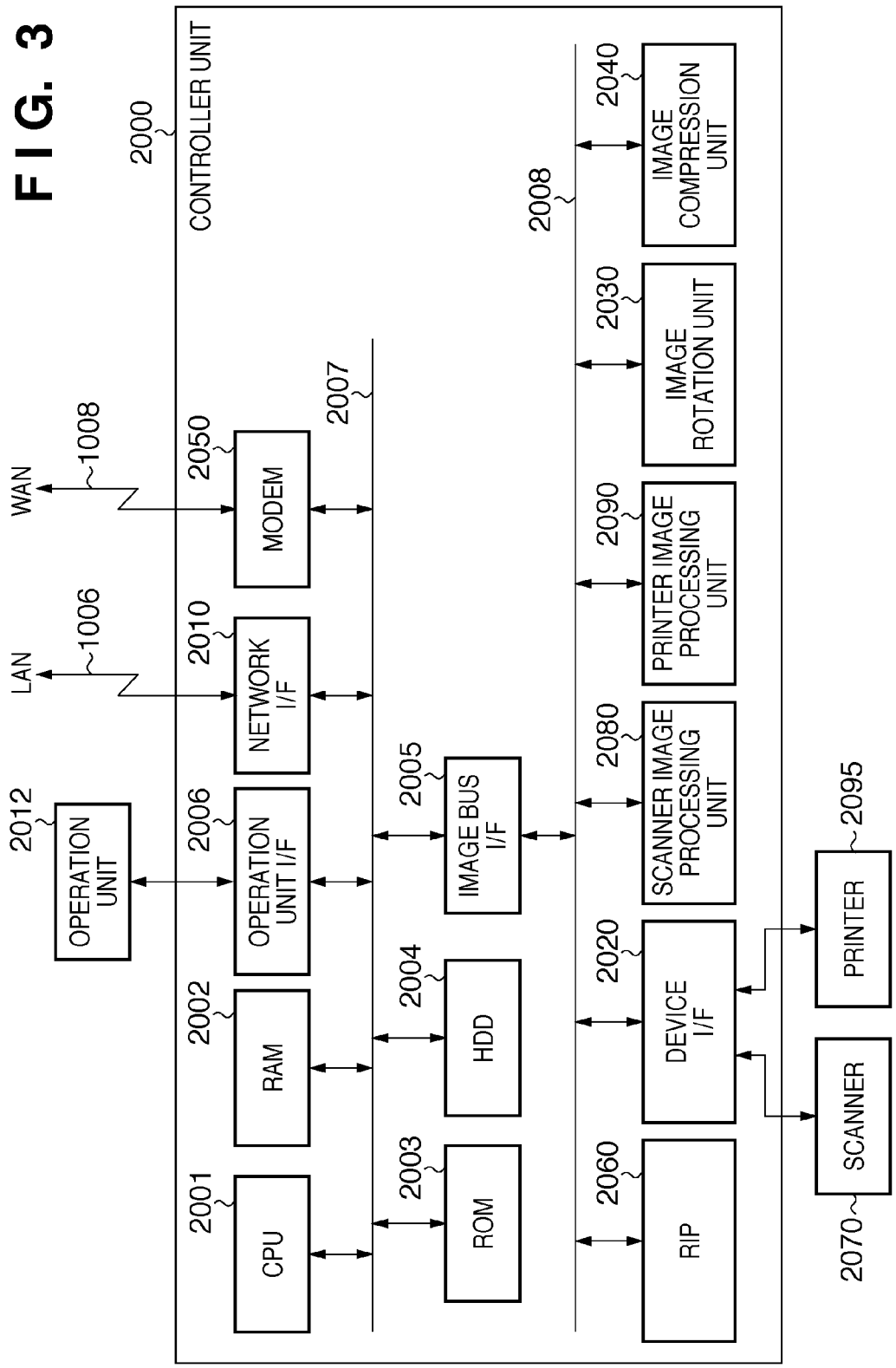

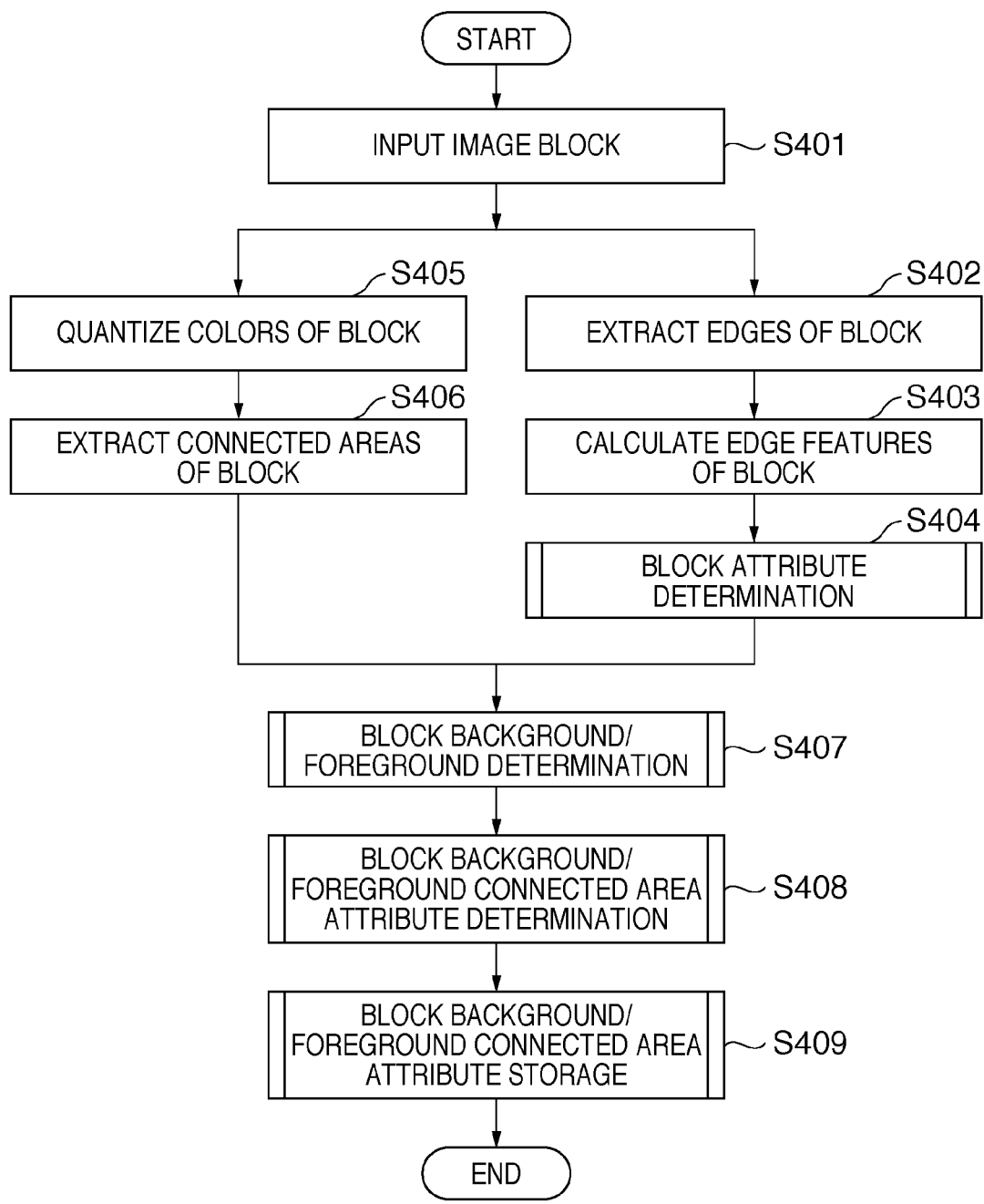

F I G. 5

| ATTRIBUTE | TYPICAL EXAMPLE | EDGE EXTRACTION RESULT (BINARIZATION) (WHITE: EDGE) | FEATURE |
|---|---|---|---|
| BACKGROUND | | | FEW EDGES |
| HALFTONE DOT | | | HALFTONE DOT PATTERN IS EXTRACTED |
| CHARACTER ON BACKGROUND AREA | A | A | LONG EDGE AROUND CHARACTER IS EXTRACTED |
| CHARACTER ON HALFTONE DOT AREA | A | A | LONG EDGE AROUND CHARACTER IS EXTRACTED, AND HALFTONE DOT PATTERN IS ALSO EXTRACTED |

FIG. 8

| ATTRIBUTE | TYPICAL EXAMPLE | RESULT OF BACKGROUND/ FOREGROUND DETERMINATION PROCESSING |
|---|---|---|
| BACKGROUND | □ | □ → BACKGROUND |
| HALFTONE DOT | ▨ | ▨ → BACKGROUND |
| CHARACTER ON BACKGROUND AREA | A | A → BACKGROUND / FOREGROUND |
| CHARACTER ON HALFTONE DOT AREA | A | A → BACKGROUND / FOREGROUND |

FIG. 9

| BLOCK ATTRIBUTE | | BLOCK FOREGROUND/BACKGROUND ATTRIBUTE FLAG | | |
|---|---|---|---|---|
| | | BACKGROUND | HALFTONE DOT | CHARACTER |
| BACKGROUND | | 1 | 0 | 0 |
| HALFTONE DOT | | 0 | 1 | 0 |
| CHARACTER ON BACKGROUND AREA | BACKGROUND | 1 | 0 | 0 |
| | CHARACTER | 1 | 0 | 1 |
| CHARACTER ON HALFTONE DOT AREA | HALFTONE DOT | 0 | 1 | 0 |
| | CHARACTER | 0 | 1 | 1 |

FIG. 10

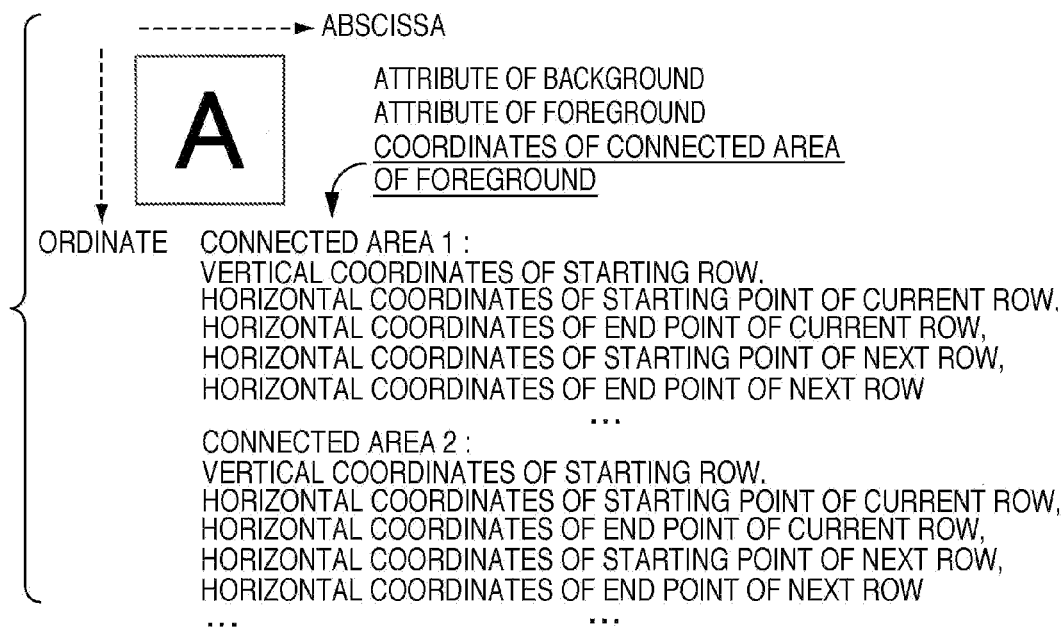

ABSCISSA

ATTRIBUTE OF BACKGROUND
ATTRIBUTE OF FOREGROUND
COORDINATES OF CONNECTED AREA
OF FOREGROUND

ORDINATE

CONNECTED AREA 1 :
VERTICAL COORDINATES OF STARTING ROW,
HORIZONTAL COORDINATES OF STARTING POINT OF CURRENT ROW,
HORIZONTAL COORDINATES OF END POINT OF CURRENT ROW,
HORIZONTAL COORDINATES OF STARTING POINT OF NEXT ROW,
HORIZONTAL COORDINATES OF END POINT OF NEXT ROW
...

CONNECTED AREA 2 :
VERTICAL COORDINATES OF STARTING ROW,
HORIZONTAL COORDINATES OF STARTING POINT OF CURRENT ROW,
HORIZONTAL COORDINATES OF END POINT OF CURRENT ROW,
HORIZONTAL COORDINATES OF STARTING POINT OF NEXT ROW,
HORIZONTAL COORDINATES OF END POINT OF NEXT ROW
...                         ...

FIG. 11

| ATTRIBUTE | TYPICAL EXAMPLE | ATTRIBUTE OF EACH CONNECTED AREA OF FOREGROUND/ BACKGROUND | STORAGE OF ATTRIBUTE DATA OF EACH CONNECTED AREA OF FOREGROUND/ BACKGROUND |
|---|---|---|---|
| BACKGROUND | | BACKGROUND, BACKGROUND (100) | 100 |
| HALFTONE DOT | | BACKGROUND, HALFTONE DOT (010) | 010 |
| CHARACTER ON BACKGROUND AREA | A | BACKGROUND : BACKGROUND (100) FOREGROUND : CHARACTER ON BACKGROUND AREA (101) | 100 101 3, 6, 8, 5, 9, 4, 10... |
| CHARACTER ON HALFTONE DOT AREA | A | BACKGROUND : HALFTONE DOT (100) FOREGROUND : CHARACTER ON HALFTONE DOT AREA (011) | 101 011 3, 6, 8, 5, 9, 4, 10... |

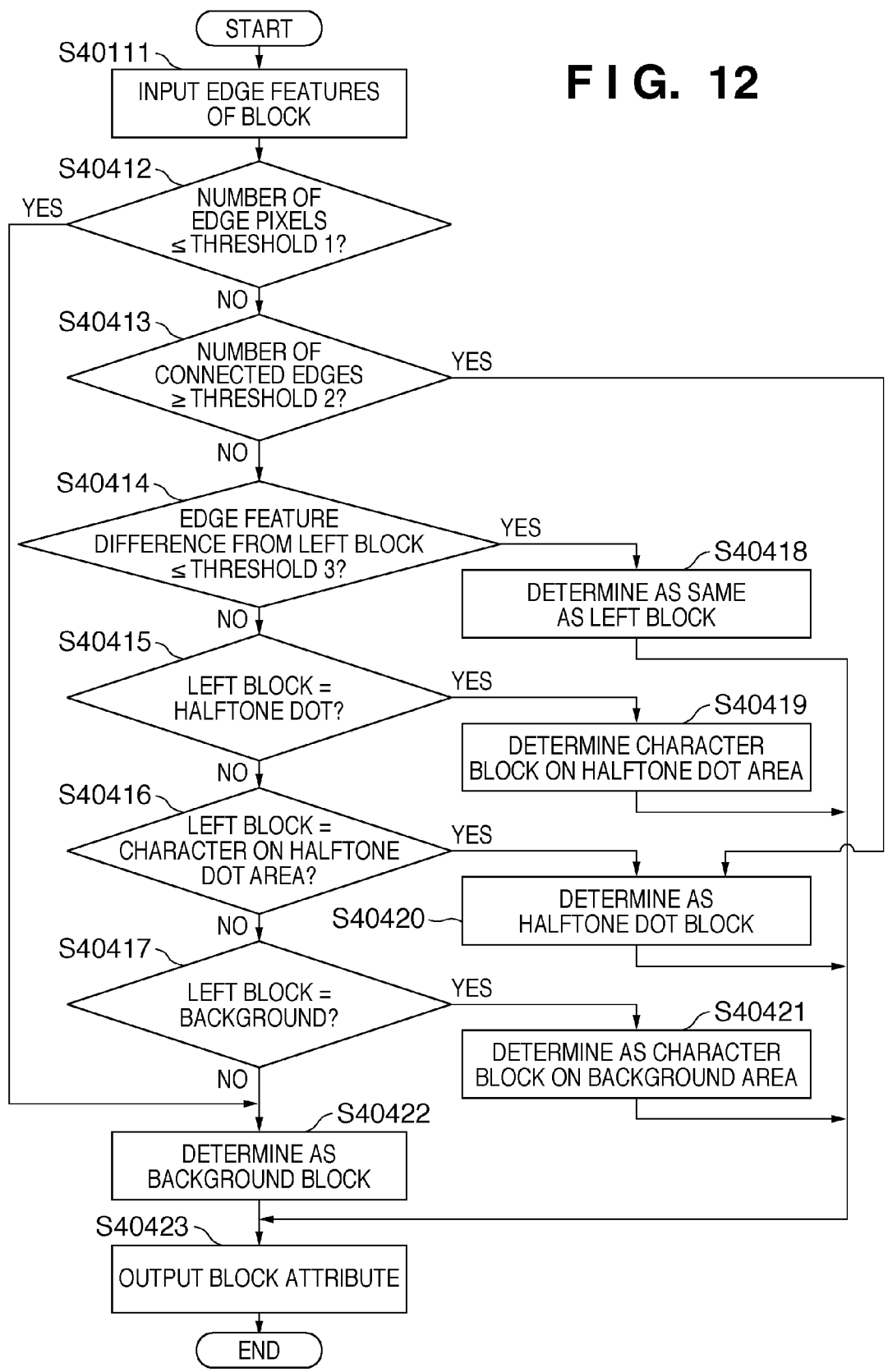

F I G. 16

| NUMBER OF MAIN COLORS | ATTRIBUTE BEFORE MODIFICATION | ATTRIBUTE AFTER MODIFICATION |
|---|---|---|
| 1 | BACKGROUND | BACKGROUND |
| | CHARACTER ON BACKGROUND AREA | |
| | HALFTONE DOT | HALFTONE DOT |
| | CHARACTER ON HALFTONE DOT AREA | |
| 2 OR MORE | BACKGROUND | CHARACTER ON BACKGROUND AREA |
| | CHARACTER ON BACKGROUND AREA | |
| | HALFTONE DOT | CHARACTER ON HALFTONE DOT AREA |
| | CHARACTER ON HALFTONE DOT AREA | |

IMAGE PROCESSING APPARATUS AND CONTROL METHOD

BACKGROUND OF THE INVENTION

1. Field of the Invention

The present invention relates to an image processing apparatus and control method that control image data.

2. Description of the Related Art

Recently proliferating copying machines cause a CCD sensor or the like to read a color document image and a digital printer to output the image data. FIG. 1 shows an example of the schematic arrangement of a copying machine. Image data input from an image scan unit 1001 undergoes scan image processing by an image processing unit 1002. And, a storage unit 1004 temporarily holds the processed image data. For printing, the image data held in the storage unit 1004 is sent to the image processing unit 1002, subjected to print image processing, and then sent to a print unit 1003.

More specifically, attribute data representing a character, halftone dot, background, and the like are generated from the input image data. A memory holds the generated attribute data. The image data adaptively undergoes filtering, gamma processing, tone processing, and the like in accordance with the attribute data. The image data is temporarily held in the memory, subjected to adaptive processing based on the attribute data, and output from the print unit. Since the scan image processing and print image processing implement high-quality image output, it is important to generate accurate attribute data. To efficiently utilize the memory, it is important to reduce the attribute data amount.

Note that to generate the attribute data of an input image, various methods based on image data in real space have conventionally been proposed. For example, there is available an image processing scheme of determining, based on frequency components obtained by orthogonal transformation of a block formed from a predetermined number of pixels of an input image, whether the block is a character area or a halftone dot area (Japanese Patent Laid-Open No. 64-81080). In another image processing scheme, each pixel of a block is determined to be a character pixel or a halftone dot pixel based on frequency components obtained by orthogonal transformation of the block. The attribute of most pixels is defined as the attribute of the block (Japanese Patent Laid-Open No. 2002-262081). Still another image processing scheme determines, based on the pixel value processed using an edge filter in a predetermined direction of a block, whether each pixel of the block is a character pixel or a halftone dot pixel (Japanese Patent Laid-Open No. 2004-350240).

However, the above-described conventional techniques have the following problems. In the schemes described in Japanese Patent Laid-Open Nos. 64-81080 and 2002-262081, each predetermined block is determined to be a character area or a halftone dot area, and image processing is applied in accordance with the attribute of the block. The scheme described in Japanese Patent Laid-Open No. 64-81080 determines the attribute based on spatial frequencies of each predetermined block. If a block attribute determination error has occurred, no appropriate image processing can be executed, and the image quality degrades. The scheme described in Japanese Patent Laid-Open No. 2002-262081 determines the attribute of each pixel of a predetermined block, and determines the block attribute by totalizing the number of pixels of each attribute. This ensures a high block attribute determination accuracy. In this scheme, however, if pixels of a different attribute mix in the predetermined block, the block attribute is determined to be one of the attributes of the mixed pixels, and this disables correct classification and determination of each attribute portion. It is therefore impossible to output a high-quality image.

In the scheme described in Japanese Patent Laid-Open No. 2004-350240, each pixel of a predetermined block is determined as one of a character pixel and a halftone dot pixel, and image processing is applied in accordance with the attribute of the pixel. The attribute determination of each pixel readily causes a determination error due to the influence of noise and the like. Especially in a character area, only pixels at the edge portions of a character are determined to have the character attribute. Since pixels inside the character are not determined to have the character attribute, the image processing result deteriorates. Although the scheme described in Japanese Patent Laid-Open No. 2004-350240 has made some contrivances for attribute data generation, a considerable memory capacity is necessary for storing the attribute of each pixel.

SUMMARY OF THE INVENTION

The present invention implements high-quality image output and reduces the attribute data amount. To do this, if a predetermined block includes pixels of a single attribute, the attribute information of each block is stored. If pixels of different attributes mix in a predetermined block, attribute information is stored in correspondence with each cluster of pixels of a single attribute. An image processing method and image processing apparatus for switching image processing for each pixel are thus provided.

According to one aspect of the present invention, there is provided an image processing apparatus comprising: a block attribute determination unit which determines, for each block including a predetermined number of pixels of a document image, an attribute of the block based on edge features of the block; a block color quantization unit which quantizes color information of each pixel of the block including the predetermined number of pixels of the document image; a block connected area extraction unit which extracts, based on the color information of each pixel quantized by the block color quantization unit, connected areas each included in the block and including connected pixels of the same color; a block background/foreground determination unit which determines whether each connected area is a foreground or a background, based on the block attribute determined by the block attribute determination unit, the color information quantized by the block color quantization unit, and the connected areas acquired by the block connected area extraction unit; a block background/foreground attribute determination unit which determines, based on the block attribute determined by the block attribute determination unit, an attribute of a connected area determined by the block background/foreground determination unit to be the foreground of the block and an attribute of a connected area determined to be the background of the block; and a block background/foreground attribute information recording unit which records and holds information of the attribute of the block determined by the block attribute determination unit and the attribute of each connected area determined by the block background/foreground attribute determination unit.

According to the present invention, it is possible to accurately determine the attribute of each block including a plurality of pixels. Along with the rise of the attribute determination accuracy, the accuracy of image processing can also be increased. It is also possible to reduce the memory utilization while keeping reversibility of each pixel attribute information of a block to the original pixel.

Further features of the present invention will become apparent from the following description of exemplary embodiments (with reference to the attached drawings).

BRIEF DESCRIPTION OF THE DRAWINGS

FIG. 1 is a block diagram showing an example of the arrangement of a copying machine;

FIG. 2 is a block diagram showing the functional arrangement of an image processing apparatus according to the first embodiment;

FIG. 3 is a block diagram showing the functional arrangement of an image processing apparatus to which the present invention is applicable;

FIG. 4 is a flowchart of attribute determination processing according to the first embodiment;

FIG. 5 is a view showing examples of edge extraction and edge features of blocks of respective attributes according to the embodiment;

FIG. 8 is a view showing an example of the result of block background/foreground determination processing according to the first embodiment;

FIG. 9 is a table for explaining block background/foreground connected area attribute determination processing according to the first embodiment;

FIG. 10 is a view for explaining block background/foreground connected area attribute storage processing according to the first embodiment;

FIG. 11 is a view showing examples of block background/foreground connected area attribute storage forms according to the first embodiment;

FIG. 12 is a flowchart of block attribute determination processing according to the second embodiment;

FIG. 16 is a table for explaining block attribute modification processing according to the fifth embodiment.

DESCRIPTION OF THE EMBODIMENTS

Figure 6:
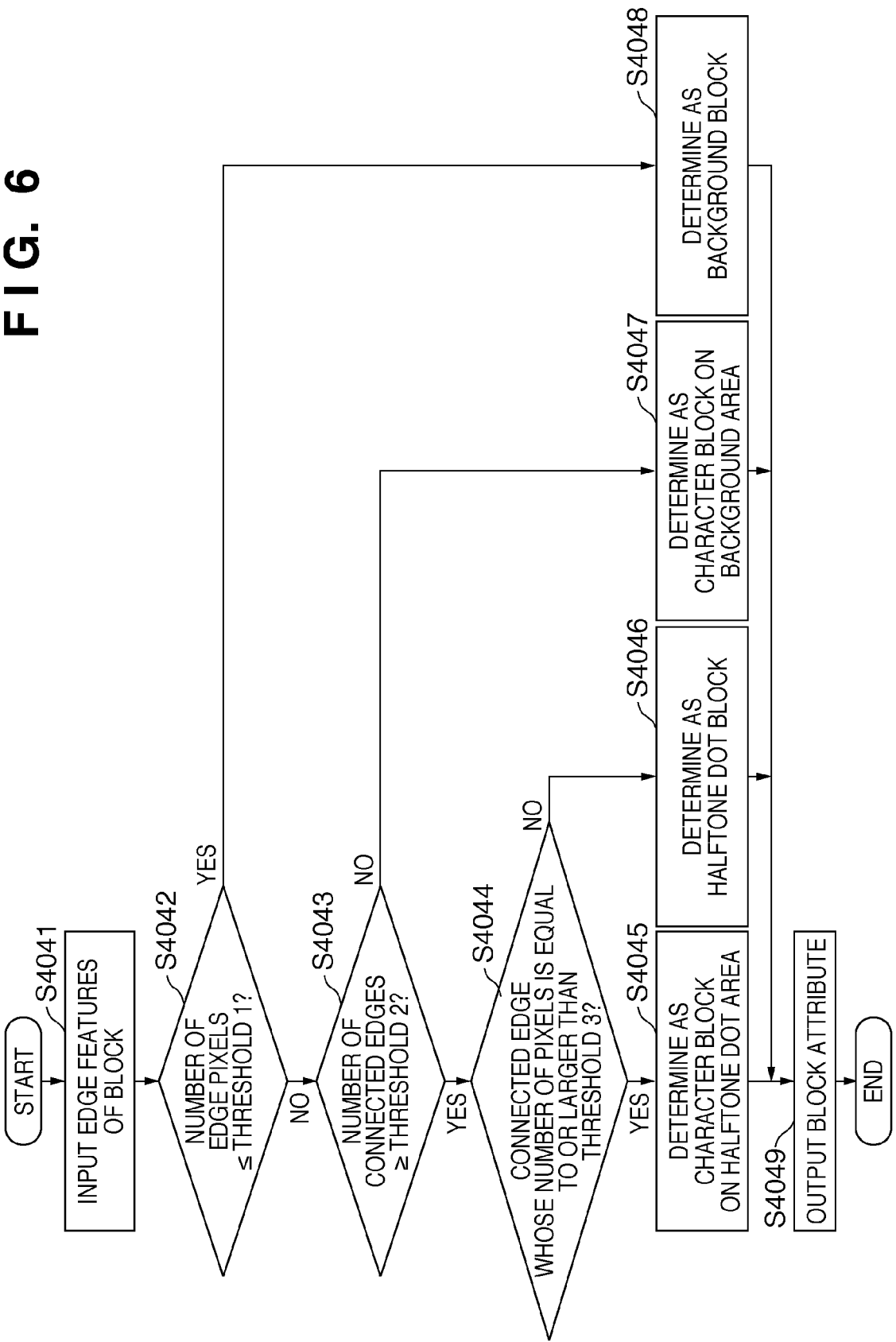
FIG. 6 is a flowchart of block attribute determination processing according to the first embodiment.

Attribute determination processing using an image processing apparatus according to the present invention will now be described in detail with reference to the accompanying drawings. Note that the constituent elements described in the embodiments are merely examples. The technical scope of the present invention is determined by the scope of claims and is not limited by the following individual embodiments.

First Embodiment

Apparatus Arrangement

FIG. 2 is a block diagram showing an example of the arrangement of an image processing apparatus according to the first embodiment of the present invention. Referring to FIG. 2, a block input unit 101 inputs the image data of a block formed from a predetermined number of pixels. This image corresponds to, for example, a monochrome or color image input via an image reading unit by for example, scanning paper information. A block attribute determination unit 102 determines which is the attribute of a block of the input image data, background, halftone dot, character on background area, or character on halftone dot area. A block color quantization unit 103 performs tone reduction of the block to obtain representative colors, converts the color of each pixel into the closest representative color, and outputs color information. A block connected area extraction unit 104 brings adjacent pixels in the same color together based on the block color quantization result, thereby obtaining connected areas. A block background/foreground determination unit 105 determines whether each connected area is the foreground or background, based on the attribute and representative colors of the block output from the block attribute determination unit 102 and the block connected area extraction unit 104. Based on the attribute of the block, a block background/foreground attribute determination unit 106 determines which is the attribute of the background, background or halftone dot, and which is the attribute of the foreground, character on background area or character on halftone dot area. A block background/foreground attribute information recording unit 107 records an attribute in association with a connected area determined to be the background, and an attribute and coordinate information for a connected area determined to be the foreground.

FIG. 3 is a block diagram showing the arrangement of the main part of a multi function peripheral (to be referred to as an MFP hereinafter) serving as an image processing apparatus to which the embodiment is applicable. In this embodiment, an MFP having a scanner function and a printer function is used as the image processing apparatus. However, for example, a system formed by connecting a general-purpose scanner and a personal computer may be used as the image processing apparatus.

As shown in FIG. 3, the MFP includes a controller unit 2000 functioning as the control unit of the image processing apparatus. The controller unit 2000 is connected to a scanner 2070 serving as an image input device and a printer 2095 serving as an image output device via a device I/F (interface) 2020. The controller unit 2000 can control to implement a copy function of causing the scanner 2070 to read a document image and the printer 2095 to print the read image data. The controller unit 2000 can also control to input/output a pattern image or device information from/to another apparatus via a LAN 1006 or a public line (WAN) 1008.

The controller unit 2000 includes a CPU 2001, as shown in FIG. 3. The CPU 2001 activates an operating system (to be referred to as an OS hereinafter) using a boot program stored in a ROM 2003. The CPU 2001 then executes various kinds of processing by executing, on the OS, application programs stored in an HDD (Hard Disk Drive) 2004. The CPU 2001 uses a RAM 2002 as a work area. The RAM 2002 provides not only the work area of the CPU 2001 but also an image memory area to temporarily store image data. The HDD 2004 stores image data as well as the application programs.

The ROM 2003 and the RAM 2002 are connected to the CPU 2001 via a system bus 2007. An operation unit I/F (interface) 2006, network I/F (interface) 2010, modem 2050, and image bus I/F (interface) 2005 are connected to the CPU 2001. The operation unit I/F 2006 serves as an interface to an operation unit 2012 having a touch panel, and outputs, to the operation unit 2012, image data to be displayed on it. The operation unit I/F 2006 also outputs, to the CPU 2001, information input by the user via the operation unit 2012. The network I/F 2010 is connected to the LAN 1006 so as to input/output, via the LAN 1006, information from/to each apparatus connected to the LAN 1006. The modem 2050 is connected to the public line 1008 so as to input/output information from/to another apparatus via the public line 1008. The image bus I/F 2005 serves as a bus bridge which connects the system bus 2007 to an image bus 2008 for transferring image data at a high speed and converts the data structure. The image bus 2008 is formed from a PCI bus or IEEE1394. A raster image processor (RIP) 2060, device I/F 2020, scanner image processing unit 2080, printer image processing unit 2090, image rotation unit 2030, and image compression unit 2040 are provided on the image bus 2008.

The RIP 2060 is a processor which rasterizes a PDL code to a bitmap image. The scanner 2070 and the printer 2095 are connected to the device I/F 2020 to perform image data conversion between a synchronous system and an asynchronous system. The scanner image processing unit 2080 corrects, manipulates, and edits input image data. The printer image processing unit 2090 performs printer correction and resolution conversion for print output image data. The image rotation unit 2030 rotates image data. The image compression unit 2040 compresses multilevel image data into JPEG data or binary image data into JBIG, MMR, or MH data, and also decompresses the image data.

<Procedure of Attribute Determination Processing>

FIG. 4 is a flowchart for explaining the procedure of determining the attribute of a block and the attribute of each connected area included in the block according to the first embodiment. The block input unit 101 inputs the image data of a block including a predetermined number of pixels of a process target image (S401). The block attribute determination unit 102 performs the processes in steps S402 to S404. First, edges are extracted from the block input in step S401 (S402). Next, the edge features of the block are calculated from the extracted edges (S403). Based on the calculated edge features, the block is determined as a background area, halftone dot area, character area on background area, or character area on halftone dot area (S404). The edge extraction is processing of generating differential data representing the edge intensity, and can use a known Prewitt filter or Sobel filter. The edge feature calculation is processing of obtaining the number of edge pixels having an edge intensity equal to or more than a predetermined value from the extracted edges, the number of connected edges from the edge pixels having an edge intensity equal to or more than a predetermined value, and the number of pixels of each connected edge. Examples of edge extraction and edge features of blocks of the respective attributes will be described later. In attribute determination of a block, the attribute of the block is determined as a background area, halftone dot area, character area on background area, or character area on halftone dot area based on the calculated edge features of the block. The block attribute determination processing will be described later in detail with reference to FIG. 6.

The block color quantization unit 103 then performs tone reduction of the block input in step S401 to obtain representative colors, and quantizes each pixel to the closest representative color (S405). Note that as an example to implement the color quantization processing, a method described in Japanese Patent Laid-Open No. 2002-142128 is usable. The quantization can be done to generate either binary data or multilevel data using a plurality of colors. The block connected area extraction unit 104 brings adjacent pixels in the same color together based on the color quantization result of each color acquired in step S405, thereby acquiring connected areas (S406). Note that the connected area extraction processing can use known labeling processing. The block background/foreground determination unit 105 determines whether each connected area extracted in step S406 is the foreground or background, based on the block attribute determined in step S404 and the representative colors of the block acquired in step S405 (S407). The block background/foreground determination processing will be described later in detail with reference to FIG. 7.

Next, the block background/foreground attribute determination unit 106 determines, based on the attribute of the block, the background as a background area or a halftone dot area, or the foreground as a character area on background area or a character area on halftone dot area (S408). The block background/foreground connected area attribute determination processing will be described later in detail with reference to FIG. 13. The block background/foreground attribute information recording unit 107 records an attribute for a connected area determined to be the background in step S408, or an attribute and coordinate information for a connected area determined to be the foreground (S409). The block background/foreground connected area attribute storage processing will be described later in detail with reference to FIG. 13.

<Examples of Edge Extraction and Edge Features of Blocks of Respective Attributes>

FIG. 5 is a view showing examples of edge extraction and edge features of blocks of the respective attributes in image processing of the first embodiment. Since the image processing is switched in accordance with the attribute, for example, background, halftone dot, character on background area, or character on halftone dot area, block attributes are classified into background, halftone dot, character on background area, and character on halftone dot area. Few edges are extracted from the background block shown in FIG. 5. Hence, the edge features of the background block are that the number of edge pixels having an edge intensity more than a predetermined threshold is very small, the number of connected edges adjacent to the edge pixels is very small, and the number of edge pixels of each connected edge is very small.

A halftone dot block is formed from moiré, and extracted edges also look like a pattern. Hence, the edge features are that the number of edge pixels is very large, the number of connected edges is very large, and the number of edge pixels of each connected edge is not extremely large or small, and they have an intermediate pixel value. In a character block on background area, edges around the character can be acquired. Hence, the edge features are that the number of edge pixels is large, the number of connected edges is small, and the number of edge pixels of each connected edge is large. In a character block on halftone dot area, not only edges around the character but also the edges of the halftone dot pattern can be acquired. Hence, the edge features are that the number of edge pixels is large, the number of connected edges is large, and the number of edge pixels of each connected edge is large, or the pixels have an intermediate pixel value like a halftone dot block.

<Block Attribute Determination Processing>

The block attribute determination processing (S404) will be described in detail with reference to FIG. 6. In step S4041, the edge features of the block are input. Based on the edge features, the attribute of the block is determined in steps S4042 to S4048. Thresholds are set in consideration of the edge features. The preset threshold of the number of edge pixels is defined as threshold 1 (first threshold), the threshold of the number of connected edges as threshold 2 (second threshold), and the threshold of the number of pixels of a connected edge as threshold 3 (third threshold). If the number of edge pixels of the block is equal to or smaller than threshold 1 in step S4042, the process advances to step S4048 to determine the block attribute as background. Since the feature that the number of edge pixels is very small in a background block is used, threshold 1 is set to a very small value. After the determination in step S4048, the process advances to step S4049. If the number of edge pixels of the block is larger than threshold 1 in step S4042, the block is a character on background area, halftone dot, or character on halftone dot area. The process advances to step S4043 to perform determination using more finely set criteria.

If the number of connected edges is smaller than threshold 2 in step S4043, the process advances to step S4047 to determine the block as a character on background area. Since the feature that the number of connected edges is small in a character on background area is used, threshold 2 is set to a small value. After the determination in step S4047, the process advances to step S4049. If the number of connected edges is equal to or larger than threshold 2 in step S4043, the block is a character on halftone dot area or a halftone dot block. The process advances to step S4044 to further perform determination. If there is at least one connected edge whose number of pixels is equal to or larger than threshold 3 in step S4044, the process advances to step S4045 to determine the block as a character on halftone dot area. If there is no connected edge whose number of pixels is equal to or larger than threshold 3, the process advances to step S4046 to determine the block as a halftone dot. Since a character on halftone dot area includes a long edge, that is, a connected edge formed from many pixels, threshold 3 is set to a large value. After each determination, the process advances to step S4049. In step S4049, the block attribute is output, and the processing ends. The criterion such as "equal to or larger than a threshold" or "equal to or smaller than a threshold" varies depending on the setting of the threshold. Consistency of determination is ensured in accordance with the threshold based on the edge features. That is, even when "equal to or smaller than the third threshold" is defined, it may change to "equal to or larger than the third threshold" depending on the setting of the threshold. Similarly, "equal to or larger than the second threshold" may change to "larger than", or "equal to or smaller than the first threshold" may change to "smaller than".

<Block Background/Foreground Determination Processing>

Figure 7:
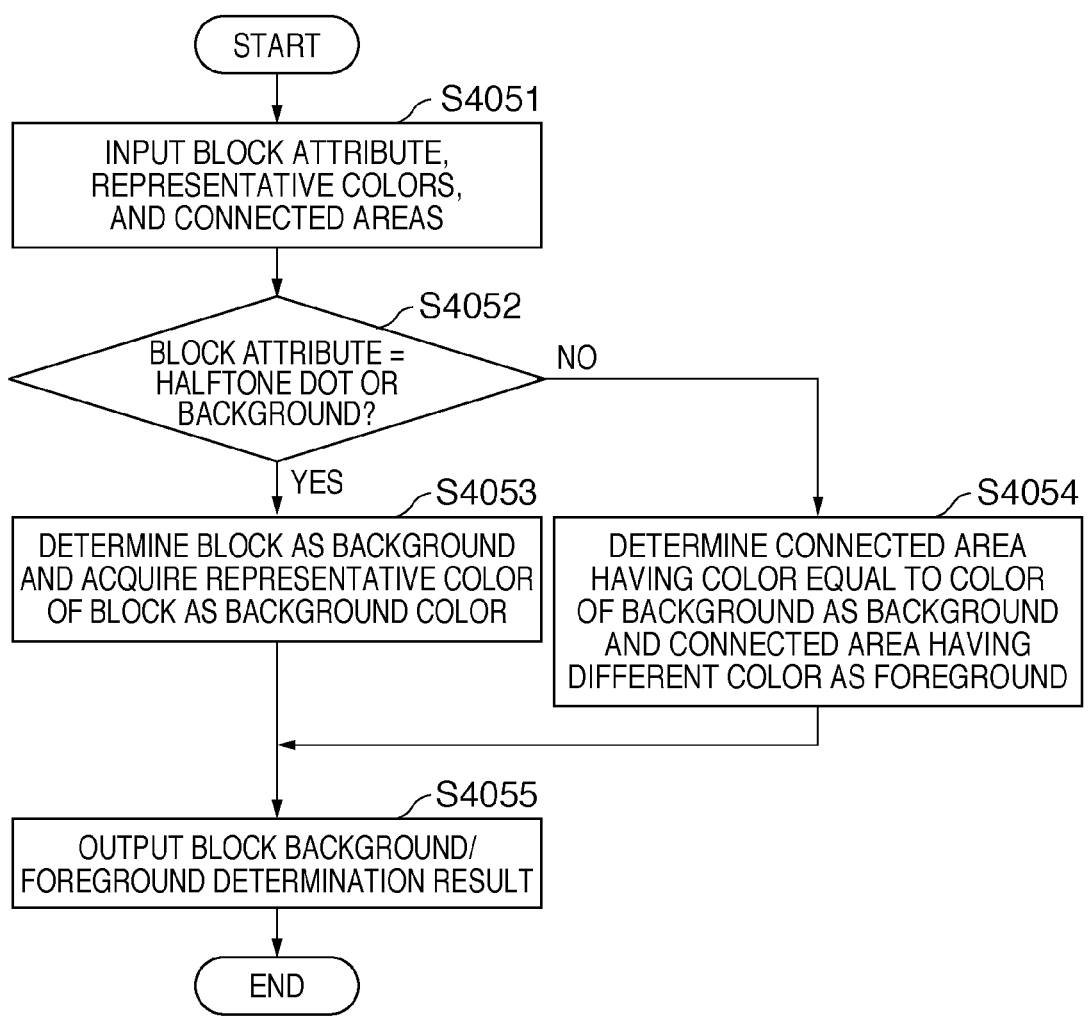
FIG. 7 is a flowchart of block background/foreground determination processing according to the first embodiment.

The block background/foreground determination processing (S405) will be described in detail with reference to FIG. 7. In step S4051, the representative colors of the block acquired by block color quantization processing, the connected areas of the block acquired by block connected area extraction processing, and the attribute information of the block acquired by block attribute determination processing are input. In steps S4052 to S4054, the block background/foreground is determined. If the block attribute is halftone dot or background in step S4052, the process advances to step S4053 to determine that the block is the background. The representative color of the block is acquired as the background color. The process then advances to step S4055. If the block attribute is character on background area or character on halftone dot area, the process advances to step S4054 to determine that the background and foreground mix in the block. Using a feature that the background color continuously changes, out of the connected areas of the block, connected areas having colors close to the already acquired background color are defined as the background. Connected areas having different colors are defined as the foreground. The process then advances to step S4055. In step S4055, the result of block background/foreground determination processing is output, and the processing ends.

FIG. 8 is a view for explaining an example of the result of block background/foreground determination processing. As shown in FIG. 8, a background block or a halftone dot block is wholly determined to be the background. However, in a character block on background area or a character block on halftone dot area, the black character portion is determined to be the foreground, and the portion around the character is determined to be the background.

<Block Background/Foreground Connected Area Attribute Determination Processing>

The block background/foreground connected area attribute determination processing will be described in detail with reference to FIG. 9. Flags representing the attribute of the block are defined. As the flag value, "1" is valid, and "0" is invalid. When the block is the background, the entire block is defined as the background, and the attribute is set to background. As a result, the background flag is 1, and the halftone dot flag and the character flag are 0. When the block is a halftone dot, the entire block is defined as the background, and the attribute is set to halftone dot. As a result, the halftone dot flag is 1, and the background flag and the character flag are 0. When the block is a character on background area, that is, the block includes character pixels, and background pixels exist around the character pixels, the attribute of the background portion of the block is set to background, but the attribute of each connected area that is the foreground is set to character on background area. As a result, for the background portion of the block, the background flag is 1, and the halftone dot flag and the character flag are 0. Each connected area that is the foreground portion of the block indicates a character on background area. Hence, the background flag and the character flag are 1, and the halftone dot flag is 0. When the block is a character on halftone dot area, that is, the block includes character pixels, and halftone dot pixels exist around the character pixels, the attribute of the background portion of the block is set to halftone dot, but the attribute of each connected area that is the foreground is set to character on halftone dot area. As a result, for the background portion of the block, the halftone dot flag is 1, and the background flag and the character flag are 0. Each connected area that is the foreground portion of the block indicates a character on halftone dot area. Hence, the halftone dot flag and the character flag are 1, and the background flag is 0.

With the above-described processing, at least one of the background flag, halftone dot flag, and character flag is validated for each pixel of the block. This makes it possible to determine each pixel as a background pixel, halftone dot pixel, a character pixel on background area, or a character pixel on halftone dot area. Image processing can also be switched accurately in accordance with the attribute of each pixel.

<Block Background/Foreground Connected Area Attribute Storage Processing>

The block background/foreground connected area attribute storage processing will be described in detail with reference to FIG. 10. If the block is the background or halftone dot, it is unnecessary to store the attribute for all pixels of the block. Storing the attribute information of the background of each block suffices. If pixels of a different attribute such as character on background area or character on halftone dot area mix in the block, the attribute of the background of the block, the attribute of the foreground of the block, and the coordinate information of each connected area of the foreground of the block are stored. The coordinate information of a connected area of the foreground includes the vertical coordinates of the starting row of the connected area, the horizontal coordinates of the starting and end points of a connected portion on the row, and the horizontal coordinates of the starting and end points of the connected portion on the next row. The pieces of coordinate information are stored in the above-described order in a form having reversibility to the information of each pixel. In this processing, if the block is formed from an aggregates of pixels of a single attribute, that is, if the block attribute is background or halftone dot, it is necessary to only store the attribute of the background as the entire block, instead of storing the attribute for all pixels of the block. This allows to largely reduce the amount of pixel attribute information to be stored as compared to storing the attribute information of all pixels. Similarly, if pixels of different attributes mix in the block, that is, if the block attribute is character on background area or character on halftone dot area, the connection information of pixels of the foreground is stored, instead of storing the attribute for all pixels of the block. This allows the amount of pixel attribute information to be stored to be decreased while keeping reversibility to the pixel attribute information.

FIG. 11 is a view showing storage examples of block background/foreground connected area attributes. In this example, 3 bits arranged in the order of background flag, halftone dot flag, and character flag express attribute information. More finely divided attribute information can also be stored in the same way. As shown in FIG. 11, attribute data is stored by expressing the attribute value of a background block as 100 and the attribute value of a halftone dot block as 010. For a character block on background area, the attribute value of the background is stored first as 100. Next, the attribute value of the foreground is stored as 101. Then, values corresponding to the coordinate information of the connected areas are stored in order. For example, the pieces of coordinate information of a connected area are described by storing 3 as the first row number of the connected area, 6 as the starting point column number of a connected portion on the third row, 8 as the end point column number of the connected portion on the same row, 5 as the starting point column number of a connected portion on the next row (fourth row), and 9 as the end point column number of the connected portion on the same row.

In the first embodiment, the processing procedure has been described by exemplifying a character. However, this processing is applicable not only to a character but also to, for example, a line having an edge in accordance with the same procedure.

Second Embodiment

In the above-described first embodiment, block attribute determination processing is done by independently determining the attribute based on the edge features of each block. In the second embodiment, block attribute determination is performed based on not only the edge features of a process target block but also the difference from the edge features of peripheral blocks. Attribute determination processing according to the second embodiment will be described in detail with reference to FIG. 12. Thresholds are set in consideration of edge features, as in the first embodiment. The preset threshold of the number of edge pixels is defined as threshold 1 (first threshold), the threshold of the number of connected edges as threshold 2 (second threshold), and the threshold of the difference from the edge features of a peripheral block (to be referred to as a left block hereinafter) adjacent to the left of the block of interest as threshold 3 (third threshold).

In step S40411, the edge features of blocks are input. Based on the edge features of the process target block and those of the peripheral blocks, the attribute of the block is determined in steps S40412 to S40422. If the number of edge pixels of the block is equal to or smaller than threshold 1 in step S40412, the process advances to step S40422 to determine the block attribute as background. Since the feature that the number of edge pixels is very small in a background block is used, threshold 1 is set to a very small value. After that, the process advances to step S40423. If the number of edge pixels of the block is larger than threshold 1 in step S40412, the process advances to step S40413. If the number of connected edges of the block is equal to or larger than threshold 2 in step S40413, the process advances to step S40420 to determine the block attribute as halftone dot. Since the features that the number of edge pixels is large, and the number of connected edges is very large in a halftone dot block are used, threshold 2 is set to a very large value. After that, the process advances to step S40423. If the number of connected edges is smaller than threshold 2 in step S40413, the process advances to step S40414 to determine the block attribute based on the difference from the edge features of a peripheral block.

As for thresholds 1 and 2, the number of edges can experimentally be obtained in sample images of background and halftone dot. For example, a plurality of different images are prepared for each of the background and halftone dot images, and statistical values such as the average and variance of the number of edges are obtained. Based on these values, the number of edges that determine a background or halftone dot image at a predetermined probability is set as a threshold.

In step S40414, the edge feature difference between the process target block and the left block is obtained. If the difference is equal to or smaller than threshold 3, the process advances to step S40418. If the difference is small, the block of interest and the left block are assumed to have the same attribute. In step S40418, the process target block is set to the same attribute as that of the left block. More specifically, if the left block is a background block, the process target block is a background block, too. If the left block is a halftone dot block, the process target block is a halftone dot block, too. If the left block is a character block on background area, the process target block is a character block on background area, too. If the left block is a character block on halftone dot area, the process target block is a character block on halftone dot area, too. The process then advances to step S40423. If the edge feature difference between the process target block and the left block is larger than threshold 3 in step S40414, the attribute of the process target block is determined in accordance with the attribute of the left block in processes of steps S40415 to S40422.

If the left block is a halftone dot block in step S40415, the process advances to step S40419 to determine the block as a character block on halftone dot area. Then, the process advances to step S40423. If the left block is not a halftone dot block in step S40415, the process advances to step S40416. If the left block is a character block on halftone dot area in step S40416, the process advances to step S40420 to determine the block as a halftone dot block. Then, the process advances to step S40423. If the left block is not a character block on halftone dot area either in step S40416, the process advances to step S40417. If the left block is the background block in step S40417, the process advances to step S40421 to determine the block as a character block on background area. Then, the process advances to step S40423. If the left block is not a background block in step S40417, the process advances to step S40422 to determine the block as a background block. Then, the process advances to step S40423. In step S40423, the determined block attribute is output.

Note that in this embodiment, the difference from the left block adjacent to the process target block is used. However, the block adjacent to the upper side may be used. One peripheral block has been handled as a target. However, the embodiment may be implemented using a plurality of peripheral blocks.

Third Embodiment

In the above-described first and second embodiments, the block background/foreground determination processing is performed assuming that the first block of a document image (the block at the upper left corner of a process target image) includes only a background portion (background block or halftone dot block). In the third embodiment, if a character portion and a background portion mix in the first block of a document image (character block on background area or character block on halftone dot area), block background/foreground determination processing is done based on the inclusion relation of connected areas included in the block. More specifically, when a character portion and background portion mix in the block, a connected area (to be referred to as a contained connected area hereinafter) surrounded by another connected area is regarded as the background, and the color of the contained connected area is set to the background color (for example, the triangle portion included in a character "A"). Connected areas (for example, character portion) other than the contained connected area are determined as the foreground.

Fourth Embodiment

In the first to third embodiments, connected area extraction processing is performed for all blocks in a process target image independently of the block attribute. In the fourth embodiment, block connected area extraction processing is applied only when the block attribute is character block on background area or character block on halftone dot area. If the block attribute is background or halftone dot, the connected area extraction processing is not executed, and the block is processed as one connected area.

Figure 13:
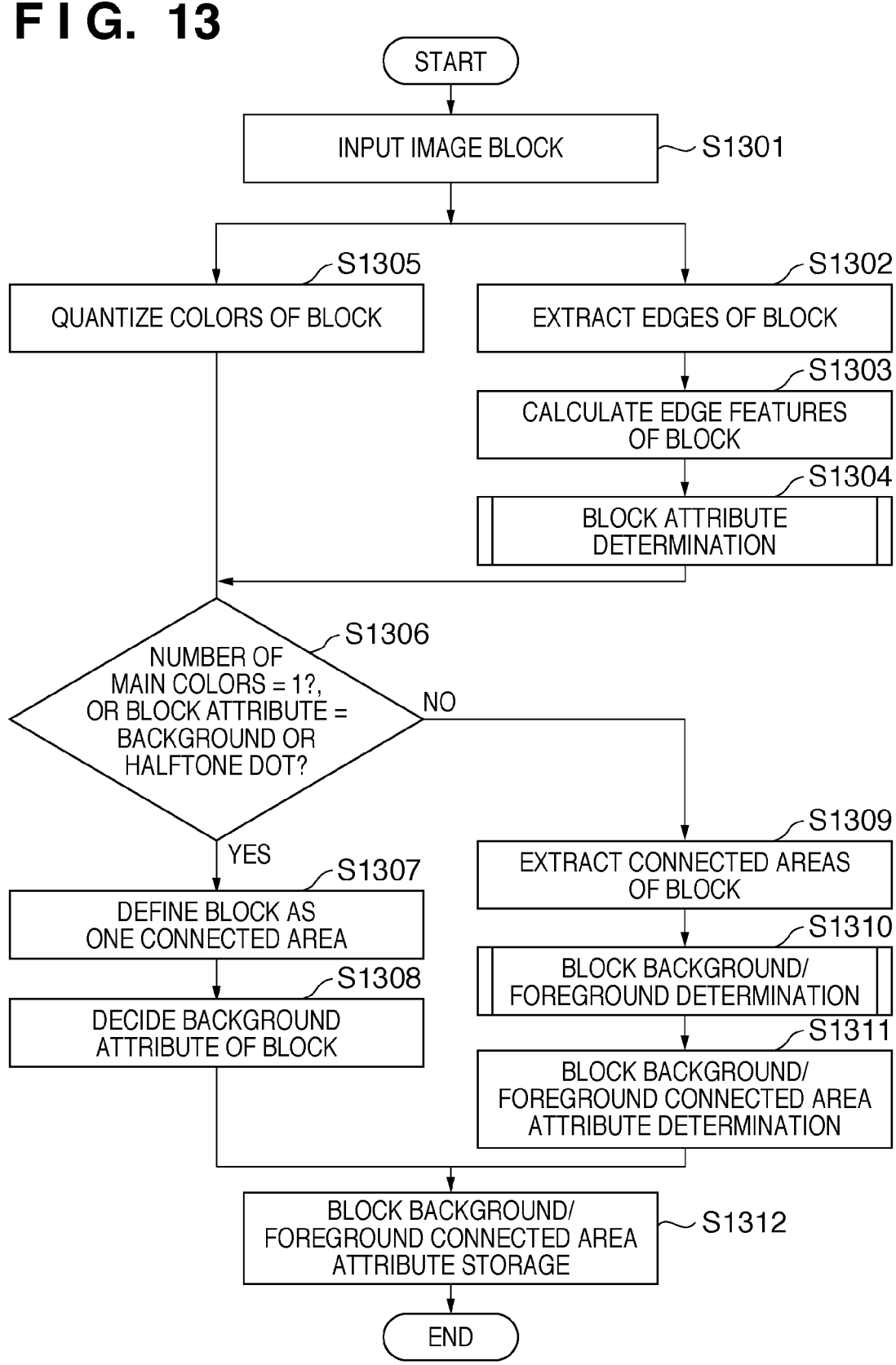
FIG. 13 is a flowchart of attribute determination processing according to the fourth embodiment.

FIG. 13 is a flowchart for explaining an outline of determining the attribute of a block and the attribute of each connected area included in the block according to the fourth embodiment. A block input unit 101 inputs the image data of a block including a predetermined number of pixels of a process target image (S1301). A block attribute determination unit 102 extracts edges from the block input in step S1301 (S1302). The edge features of the block are calculated from the edges extracted in step S1302 (S1303). Based on the calculated edge features, the attribute of the block is determined as a background area, halftone dot area, character area on background area, or character area on halftone dot area (S1304). This processing is the same as that of the first embodiment described with reference to FIG. 6.

Besides the processing of the block attribute determination unit 102, a block color quantization unit 103 performs tone reduction of the block input in step S1301 to obtain representative colors, and quantizes each pixel to the closest representative color (S1305). After the processing of the block attribute determination unit 102 and the block color quantization unit 103, a block connected area extraction unit 104 determines, based on the block attribute acquired in step S1304 and the result of color quantization of each pixel acquired in step S1305, whether the block has only one main color or whether the block attribute is background or halftone dot (S1306). The main color is a color important for the color arrangement out of the representative colors acquired by color quantization. If the condition of step S1306 is satisfied, the block is supposed to be a background block, and the whole block is defined as one connected area (S1307). If the block attribute is neither background nor halftone dot, a connected area formed from pixels connected in the same color is acquired in the block (S1309).

If the condition of step S1306 is satisfied, and a connected area has been acquired in step S1307, a block background/foreground determination unit 105 sets the connected area of the block acquired in step S1307 to the background. If the condition of step S1306 is not satisfied, and a connected area has been extracted in step S1309, the block background/foreground determination unit 105 determines the foreground and background based on the block connected area acquired in step S1309 and the attribute information determined in step S1304 (S1310). This processing is the same as that of the first embodiment described with reference to FIG. 7. If the block includes only the background (when the process in step S1307 has been performed), a block background/foreground attribute determination unit 106 determines which is the attribute of the background, background or halftone dot, thereby deciding the attribute (S1308). If the block includes the foreground and background (when the process in step S1310 has been performed), the block background/foreground attribute determination unit 106 determines which is the attribute of the background, background or halftone dot area, and which is the attribute of the foreground, character area on background area or character area on halftone dot (S1311). Next, a block background/foreground attribute information recording unit 107 records an attribute for a connected area determined to be the background, and an attribute and coordinate information in the block for a connected area determined to be the foreground (S1312).

Fifth Embodiment

In the first to fourth embodiments, the block attribute is determined based on the edge features of the process target block or the difference from the edge features of a peripheral block. In the fifth embodiment, after block attribute determination, block attribute modification is applied based on the block color quantization result.

Figure 14:
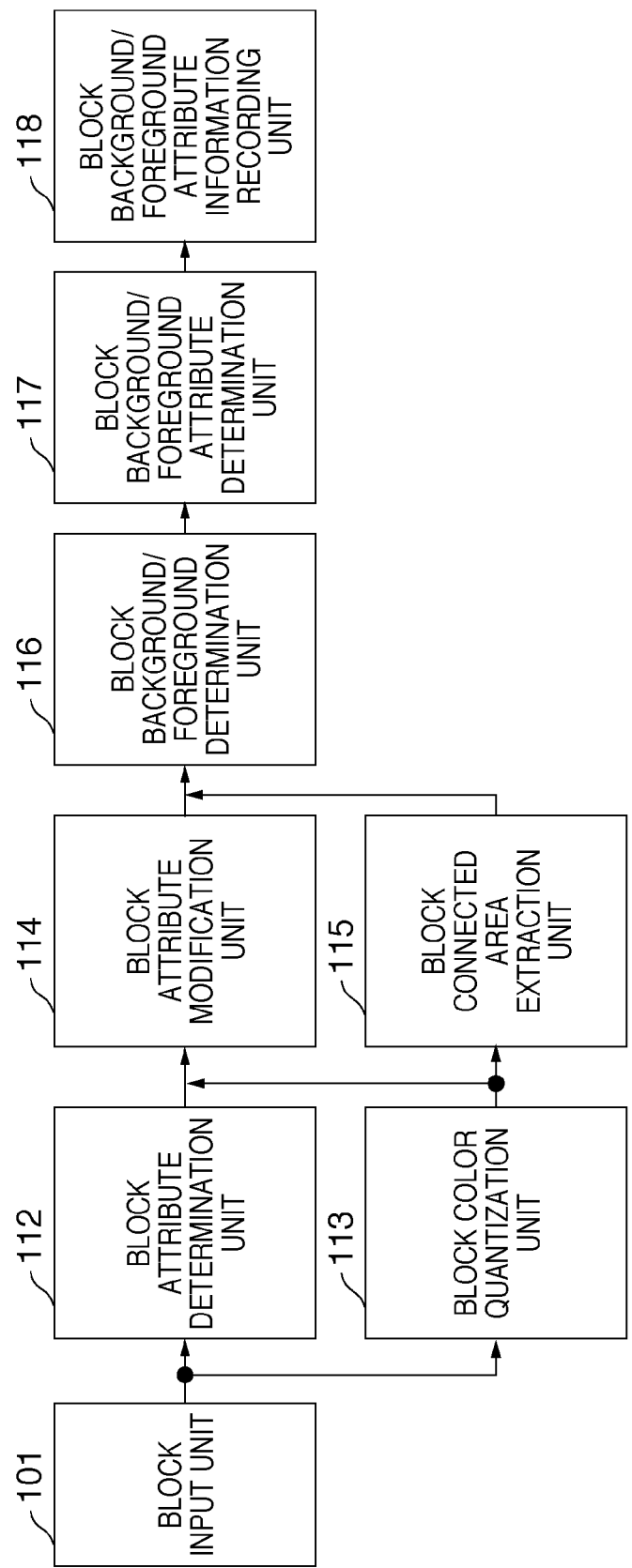
FIG. 14 is a block diagram showing the functional arrangement of an image processing apparatus according to the fifth embodiment.

FIG. 14 is a block diagram showing the arrangement of an image processing apparatus having an attribute determination function according to the fifth embodiment. Referring to FIG. 14, a block input unit 111 inputs the image data of a block formed from a predetermined number of pixels. This image corresponds to, for example, a monochrome or color image input via an image reading unit by for example, scanning paper information. A block attribute determination unit 112 determines which is the attribute of a block of the input image data, background, halftone dot, character on background area, or character on halftone dot area. A block color quantization unit 113 performs tone reduction of the block to obtain representative colors, and converts the color of each pixel into the closest representative color. A block attribute modification unit 114 modifies the block attribute based on the results from the block attribute determination unit 112 and the block color quantization unit 113.

A block connected area extraction unit 115 brings adjacent pixels in the same color together based on the block color quantization result, thereby obtaining connected areas. A block background/foreground determination unit 116 determines whether each connected area is the foreground or background, based on the attribute and representative colors of the block output from the block attribute modification unit 114 and the block connected area extraction unit 115. Based on the attribute of the block, a block background/foreground attribute determination unit 117 determines which is the attribute of the background, background or halftone dot, and which is the attribute of the foreground, character on background area or character on halftone dot area. A block background/foreground attribute information recording unit 118 records an attribute in association with a connected area determined to be the background, or an attribute and coordinate information for a connected area determined to be the foreground.

<Procedure of Processing>

Figure 15:
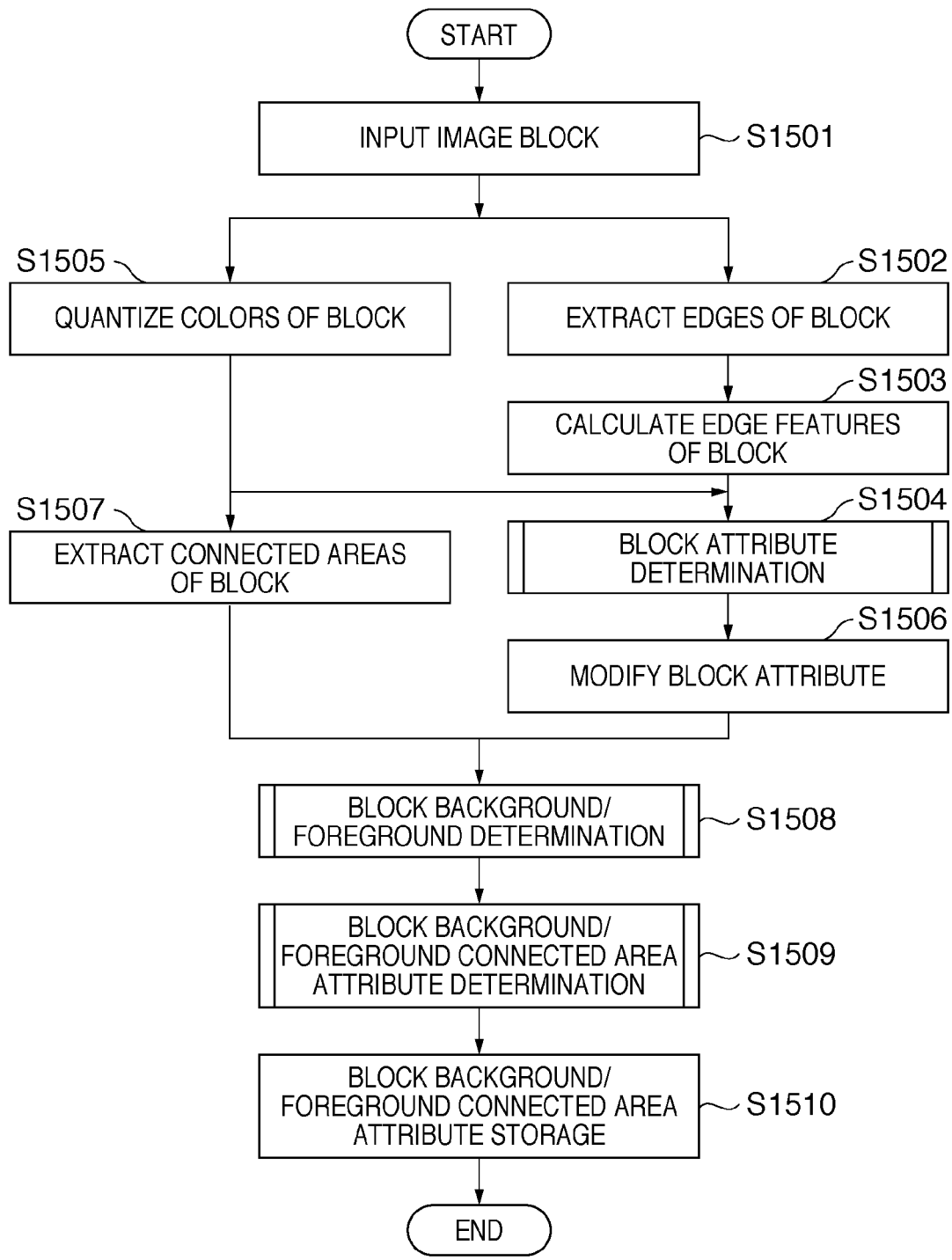
FIG. 15 is a flowchart showing an outline of attribute determination processing according to the fifth embodiment.

FIG. 15 is a flowchart for explaining the procedure of determining the attribute of a block and the attribute of each connected area included in the block according to the fifth embodiment.

First, the block input unit 111 inputs the image data of a block including a predetermined number of pixels of a process target image (S1501). The block attribute determination unit 112 extracts edges from the block input in step S1501 (S1502). Subsequently, the edge features of the block are calculated from the extracted edges (S1503). Based on the calculated edge features, the block is determined as a background area, halftone dot area, character area on background area, or character area on halftone dot area (S1504). This processing is the same as that of the first embodiment described with reference to FIG. 6. Besides the processing of the block attribute determination unit 112, the block color quantization unit 113 performs tone reduction of the block input in step S1501 to obtain representative colors, and quantizes each pixel to the closest representative color (S1505).

Next, the block attribute modification unit 114 modifies the block attribute based on the block attribute determined in step S1504 and the block color quantization result obtained in step S1505 (S1506). The block attribute modification processing will be described in detail in the next paragraph. Besides the process in step S1506, the block connected area extraction unit 115 acquires connected areas each formed from pixels connected in the same color based on the color quantization result of each pixel acquired in step S1505 (S1507). The block background/foreground determination unit 116 determines the foreground and background portions based on the block attribute information acquired in step S1506 and the block connected areas acquired in step S1507 (S1508). This processing is the same as that of the first embodiment described with reference to FIG. 7. Next, the block background/foreground attribute determination unit 117 determines, the background of the block as a background area or a halftone dot area, and the foreground as a character area on background area or a character area on halftone dot area (S1509). This processing is the same as that of the first embodiment described with reference to FIG. 12. The block background/foreground attribute information recording unit 118 records an attribute for the background, and an attribute and connected area coordinate information for the foreground (S1510). This processing is the same as that of the first embodiment described with reference to FIG. 13.

<Block Attribute Modification Processing>

The block attribute modification processing (S1506) will be described in detail with reference to FIG. 16. If the number of main colors is 1 as the result of block color quantization in step S1505, the block includes only the background portion. Hence, if the block attribute has been determined in step S1504 as character on background area or character on halftone dot area, the block attribute is modified to background or halftone dot. If the number of main colors is 2 or more as the result of block color quantization in step S1505, the block includes the background and foreground portions. Hence, if the block attribute has been determined as background or halftone dot, the block attribute is modified to character on background area or character on halftone dot area. The block attribute is thus modified based on the block color quantization result. This allows to more accurately determine the block attribute.

As described above, according to this embodiment, even if pixels of different attributes mix in a block, the attribute of the block and the attribute of each pixel can accurately be determined. This also increases the accuracy of image processing that is switched in accordance with the attribute of each pixel, and allows to attain high image quality. Instead of storing the attribute of each pixel in a block, data is stored while keeping reversibility to the attribute information of each pixel for each connected area of the pixels. Hence, the attribute information amount can be reduced.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-097393, filed Apr. 13, 2009, which is hereby incorporated by reference herein in its entirety.

What is claimed is:

1. An image processing apparatus comprising:
a block attribute determination unit which determines, for each block including a predetermined number of pixels of a document image, a block attribute based on the number of edge pixels included in the block, the number of connected edges formed from the edge pixels, and the number of edge pixels included in a connected area formed from the edge pixels,
wherein the block attribute determination unit determines the block attribute as a background block, which is formed with background pixels, when the number of edge pixels included in the block is not more than a first threshold, and
wherein the block attribute determination unit determines the block attribute as a character block on background area, which is formed with background pixels and character pixels, when the number of edge pixels included in the block is more than the first threshold and the number of connected edges is less than a second threshold, and
wherein the block attribute determination unit determines the block attribute as a halftone dot block, which is formed from halftone dot pixels, when the number of edge pixels included in the block is more than the first threshold, the number of connected edges is not less than the second threshold, and there is no connected edge whose number of edge pixels included in the connected area is not less than the third threshold, and wherein the block attribute determination unit determines the block attribute as a character block on halftone dot area, which is formed from halftone dot pixels and character pixels, when the number of edge pixels included in the block is more than the first threshold, the number of connected edges is not less than the second threshold, and there is a connected edge whose number of edge pixels included in the connected area is not less than the third threshold;

a block color quantization unit which quantizes color information of each pixel of the block including the predetermined number of pixels of the document image;

a block connected area extraction unit which extracts, based on the color information of each pixel quantized by the block color quantization unit, connected areas each included in the block and including connected pixels of the same color;

a block background/foreground determination unit which determines whether each connected area is a foreground or a background, based on the block attribute determined by the block attribute determination unit, the color information quantized by the block color quantization unit, and the connected areas acquired by the block connected area extraction unit;

a block background/foreground attribute determination unit which determines, based on the block attribute determined by the block attribute determination unit, an attribute of a connected area determined by the block background/foreground determination unit to be the foreground of the block and an attribute of a connected area determined to be the background of the block; and a block background/foreground attribute information recording unit which records and holds information of the attribute of the block determined by the block attribute determination unit and the attribute of each connected area determined by the block background/foreground attribute determination unit.

2. The apparatus according to claim 1, wherein the block color quantization unit performs tone reduction to generate one of binary data and multilevel data of the pixels of the block.

3. The apparatus according to claim 1, wherein
the block background/foreground determination unit acquires, as a background color, a color of a block whose attribute has been determined by the block attribute determination unit as one of background and halftone dot, and
if a color of the connected area included in the block whose attribute has been determined as one of character on background area and character on halftone dot area is different from the background color, the block background/foreground determination unit determines the connected area as the foreground.

4. The apparatus according to claim 1, wherein
based on the block attribute determined by the block attribute determination unit and a result of the connected area determined by the block background/foreground determination unit,
the block background/foreground attribute determination unit determines the background of the block as halftone dot if the block attribute is one of halftone dot and character on halftone dot area,
determines the background of the block as background if the block attribute is one of background and character on background area,
determines the connected area determined to be the foreground of the block as character on background area if the block attribute is character on background area, and
determines the connected area determined to be the foreground of the block as character on halftone dot area if the block attribute is character on halftone dot area.

5. A control method comprising:
a block attribute determination step of causing a block attribute determination unit of an image processing apparatus to determine, for each block including a predetermined number of pixels of a document image, a block attribute based on the number of edge pixels included in the block, the number of connected edges formed from the edge pixels, and the number of edge pixels included in a connected area formed from the edge pixels,
wherein the block attribute determination step determines the block attribute as a background block, which is formed with background pixels, when the number of edge pixels included in the block is not more than a first threshold, and
wherein the block attribute determination step determines the block attribute as a character block on background area, which is formed with background pixels and character pixels, when the number of edge pixels included in the block is more than the first threshold and the number of connected edges is less than a second threshold, and
wherein the block attribute determination step determines the block attribute as a halftone dot block, which is formed from halftone dot pixels, when the number of edge pixels included in the block is more than the first threshold, the number of connected edges is not less than the second threshold, and there is no connected edge whose number of edge pixels included in the connected area is not less than the third threshold, and
wherein the block attribute determination step determines the block attribute as a character block on halftone dot area, which is formed from halftone dot pixels and character pixels, when the number of edge pixels included in the block is more than the first threshold, the number of connected edges is not less than the second threshold, and there is a connected edge whose number of edge pixels included in the connected area is not less than the third threshold;
a block color quantization step of causing a block color quantization unit of the image processing apparatus to quantize color information of each pixel of the block including the predetermined number of pixels of the document image;
a block connected area extraction step of causing a block connected area extraction unit of the image processing apparatus to extract, based on the color information of each pixel quantized in the block color quantization step, connected areas each included in the block and including connected pixels of the same color;
a block background/foreground determination step of causing a block background/foreground determination unit of the image processing apparatus to determine whether each connected area is a foreground or a background, based on the block attribute determined in the block attribute determination step, the color information quantized in the block color quantization step, and the connected areas acquired in the block connected area extraction step;
a block background/foreground attribute determination step of causing a block background/foreground attribute determination unit of the image processing apparatus to determine, based on the block attribute determined in the block attribute determination step, an attribute of a connected area determined in the block background/foreground determination step to be the foreground of the block and an attribute of a connected area determined to be the background of the block; and a block background/foreground attribute information recording step of causing a block background/foreground attribute information recording unit of the image processing apparatus to record and hold information of the attribute of the block determined in the block attribute determination step and the attribute of each connected area determined in the block background/foreground attribute determination step.

6. A non-transitory computer-readable medium storing a program which causes a computer to function as:

a block attribute determination unit which determines, for each block including a predetermined number of pixels of a document image, a block attribute based on the number of edge pixels included in the block, the number of connected edges formed from the edge pixels, and the number of edge pixels included in a connected area formed from the edge pixels, wherein the block attribute determination unit determines the block attribute as a background block, which is formed with background pixels, when the number of edge pixels included in the block is not more than a first threshold, and wherein the block attribute determination unit determines the block attribute as a character block on background area, which is formed with background pixels and character pixels, when the number of edge pixels included in the block is more than the first threshold and the number of connected edges is less than a second threshold, and wherein the block attribute determination unit determines the block attribute as a halftone dot block, which is formed from halftone dot pixels, when the number of edge pixels included in the block is more than the first threshold, the number of connected edges is not less than the second threshold, and there is no connected edge whose number of edge pixels included in the connected area is not less than the third threshold, and wherein the block attribute determination unit determines the block attribute as a character block on halftone dot area, which is formed from halftone dot pixels and character pixels, when the number of edge pixels included in the block is more than the first threshold, the number of connected edges is not less than the second threshold, and there is a connected edge whose number of edge pixels included in the connected area is not less than the third threshold;

a block color quantization unit which quantizes color information of each pixel of the block including the predetermined number of pixels of the document image;

a block connected area extraction unit which extracts, based on the color information of each pixel quantized by the block color quantization unit, connected areas each included in the block and including connected pixels of the same color;

a block background/foreground determination unit which determines whether each connected area is a foreground or a background, based on the block attribute determined by the block attribute determination unit, the color information quantized by the block color quantization unit, and the connected areas acquired by the block connected area extraction unit;

a block background/foreground attribute determination unit which determines, based on the block attribute determined by the block attribute determination unit, an attribute of a connected area determined by the block background/foreground determination unit to be the foreground of the block and an attribute of a connected area determined to be the background of the block; and a block background/foreground attribute information recording unit which records and holds information of the attribute of the block determined by the block attribute determination unit and the attribute of each connected area determined by the block background/foreground attribute determination unit.

* * * * *